United States Patent
Brandwine

(10) Patent No.: US 12,132,704 B1
(45) Date of Patent: Oct. 29, 2024

(54) WEB COOKIE FIREWALL

(71) Applicant: Amazon Technologies, Inc., Seattle, WA (US)

(72) Inventor: Eric Jason Brandwine, Haymarket, VA (US)

(73) Assignee: Amazon Technologies Inc., Seattle, WA (US)

( * ) Notice: Subject to any disclaimer, the term of this patent is extended or adjusted under 35 U.S.C. 154(b) by 643 days.

(21) Appl. No.: 17/354,809

(22) Filed: Jun. 22, 2021

(51) Int. Cl.
*H04L 9/40* (2022.01)

(52) U.S. Cl.
CPC ...... *H04L 63/0236* (2013.01); *H04L 63/0263* (2013.01); *H04L 63/08* (2013.01)

(58) Field of Classification Search
CPC .. H04L 63/0236; H04L 63/0263; H04L 63/08
USPC .......................................................... 726/11
See application file for complete search history.

(56) References Cited

U.S. PATENT DOCUMENTS

| | | | | |
|---|---|---|---|---|
| 8,312,543 | B1* | 11/2012 | Gardner | H04L 67/02 726/22 |
| 9,531,719 | B1* | 12/2016 | Sutton | H04L 63/083 |
| 2005/0198525 | A1* | 9/2005 | Trossen | H04L 67/5683 726/22 |
| 2006/0190990 | A1* | 8/2006 | Gruper | H04L 63/08 726/3 |
| 2006/0272003 | A1* | 11/2006 | Andreasen | H04L 41/5045 726/1 |
| 2007/0260603 | A1* | 11/2007 | Tuscano | G06F 16/9535 707/999.009 |
| 2010/0107234 | A1* | 4/2010 | Aldor | G06F 21/64 726/9 |
| 2013/0246563 | A1* | 9/2013 | Cardozo | G06F 16/955 709/217 |
| 2014/0019518 | A1* | 1/2014 | Nepper | G06F 16/9574 709/203 |
| 2015/0067116 | A1* | 3/2015 | Lyman | G06Q 30/0255 709/223 |
| 2015/0381656 | A1* | 12/2015 | Kelson | H04L 63/0435 713/153 |
| 2017/0346830 | A1* | 11/2017 | Goldfarb | H04L 63/104 |
| 2018/0293375 | A1* | 10/2018 | Wang | G06F 21/53 |
| 2020/0034483 | A1* | 1/2020 | Zhang | H04L 61/4511 |
| 2020/0153809 | A1* | 5/2020 | Marzorati | H04L 9/0643 |

\* cited by examiner

*Primary Examiner* — Dant B Shaifer Harriman
(74) *Attorney, Agent, or Firm* — Nicholson DeVos Webster & Elliott LLP

(57) ABSTRACT

Techniques are described for providing a web cookie firewall application capable of monitoring and controlling the use of web cookies at computing devices. The web cookie firewall application uses web cookie security policies to selectively allow or prohibit the storage or use of individual web cookies or types of web cookies. For example, web cookie security permissions can be defined by such policies to permit or deny the storage or use of web cookies associated with certain website domains, to permit or deny the storage or use of defined types of cookies, or to control access to web cookies based on other attributes. The web cookie firewall application can be implemented as a standalone application, as a web browser plugin or extension, or as any other type of software application that it is capable of monitoring and controlling the use web cookies on a computing device.

24 Claims, 9 Drawing Sheets

WEB COOKIE FIREWALL

BACKGROUND

Users associated with various types of organizations are commonly provided with computing devices (e.g., laptops, desktop computers, mobile devices, etc.) that are capable of accessing the Internet. Users might typically use such devices to communicate via email, use various applications, and access websites using a web browser, among other uses. While the Internet provides a wide range of useful services and information, the use of some websites may be deemed undesirable from a data security. Many organizations desire the ability to maintain some control over the use of services provided by websites while preserving users' privacy to the greatest extent possible.

BRIEF DESCRIPTION OF DRAWINGS

Various embodiments in accordance with the present disclosure will be described with reference to the drawings, in which.

DETAILED DESCRIPTION

Figure 1:
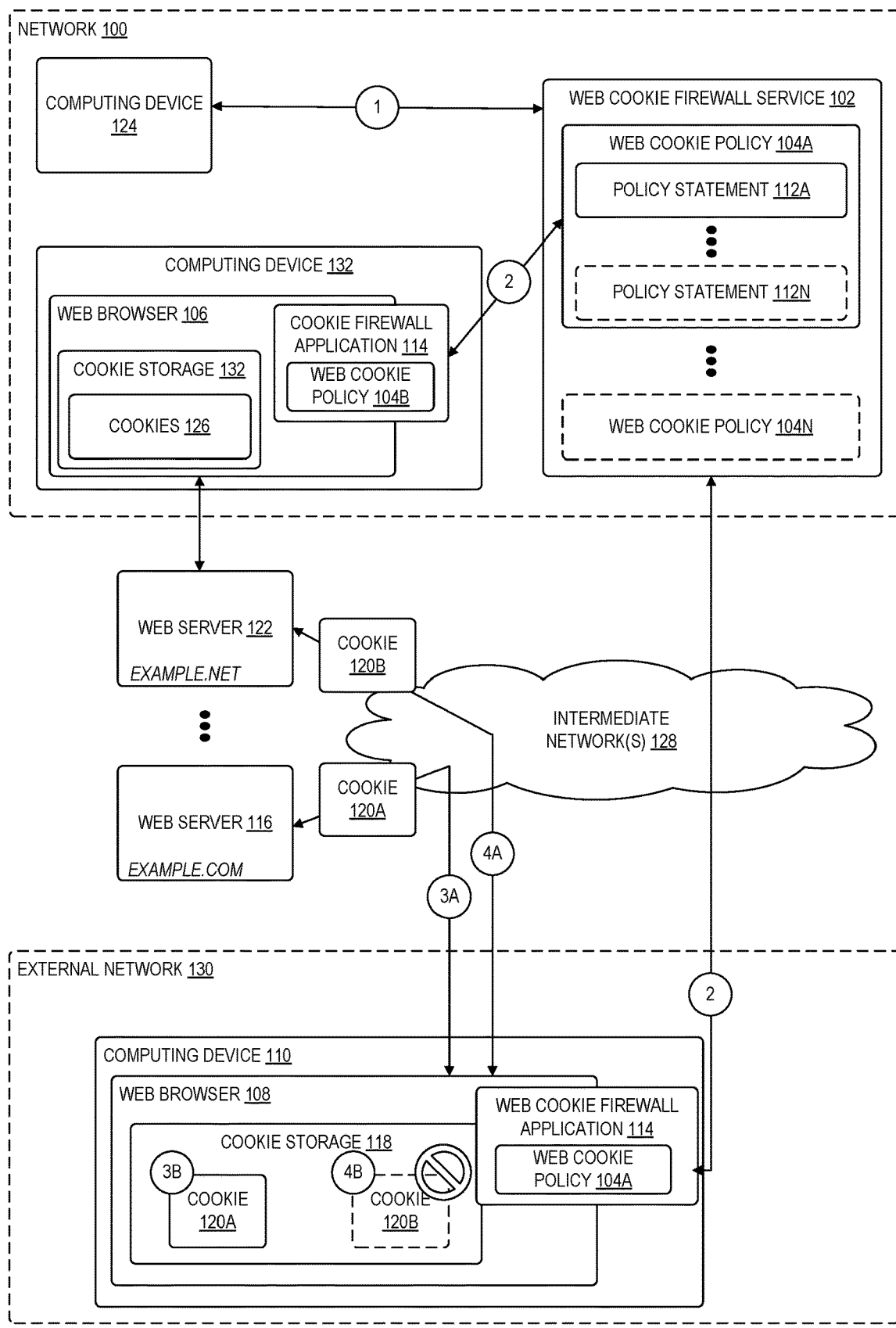
FIG. 1 is a diagram illustrating an environment in which a web cookie firewall application is used to monitor and control the use of web cookies at computing devices used to access websites on the internet according to some embodiments.

The present disclosure relates to methods, apparatus, systems, and non-transitory computer-readable storage media for providing a web cookie firewall application capable of monitoring and controlling the use of web cookies at computing devices used to access websites on the internet. According to some embodiments, the web cookie firewall application uses web cookie security policies to selectively allow or prohibit the storage or use of individual web cookies or types of web cookies. For example, web cookie security permissions can be defined by such policies to permit or deny the storage or use of web cookies associated with certain website domains, to permit or deny the storage or use of defined types of cookies (e.g., to deny the use of web cookies known to store login or session information, while permitting the use of web cookies known to store personalization or other information), or to control access to web cookies based on other attributes such as web cookie names, cookie content, etc. The web cookie firewall application can be implemented as a standalone application, as a web browser plugin or extension, or as any other type of software application that it is capable of monitoring and controlling the use web cookies on a computing device.

In some embodiments, a web cookie firewall service is further provided to enable users to configure web cookie policies using a centralized tool, where configured web cookie policies can be deployed to web cookie firewall applications at user computing devices as desired. For example, an organization (e.g., a business entity, academic institution, or other group) can use a web cookie firewall service to configure web cookie policies to be applied at computing devices issued by the organization to various users or to computing devices otherwise managed by the organization. Among other benefits, a web cookie firewall application and web cookie firewall service as described herein enables the configuration and implementation of fine-grained policies related to the use of web cookies that result in minimal restrictions to users' web activity while preserving user privacy in the process.

A web cookie (sometimes referred to as a HyperText Transport Protocol (HTTP) cookie, browser cookie, or Internet cookie) is a small piece of data that a web server sends to a web browser running on a client computing device responsive to requests sent by the web browser, e.g., to view webpages associated with a website hosted by the web server. Upon receiving a web cookie from a web server, a web browser may store the web cookie locally (e.g., in a file or other data store on disk) and send the web cookie back with subsequent requests identifying a same website domain assigned to the web cookie. Web cookies are commonly used to enable web servers to determine whether two or more requests originate from a same user agent (e.g., a same web browser running on a client device). Stateful information contained in web cookies included in such requests can be used, for example, to provide session management, personalization, and user tracking while using the otherwise stateless HTTP protocol.

Users associated with various types of organizations are commonly provided with computing devices (e.g., laptops, desktop computers, mobile devices, etc.) that can be configured to access the internet. For example, users might typically use such devices to communicate via email, to use various applications to perform work or personal tasks, and to access the internet using a web browser or other application. While the internet provides users with a wide range of useful services and information, the use of some websites may be deemed undesirable from a data security or other information technology (IT) related perspective. For these and other reasons, organizations often desire the ability to maintain some control over the use of services provided by websites that users may access, while also desiring to preserve users' privacy to the greatest extent possible.

The aforementioned challenges, among others, are addressed by the web cookie firewall application and associated web cookie firewall service described herein. According to some embodiments, the web cookie firewall application monitors and controls the use of web cookies on a per-cookie basis and based on defined web cookie security policies. For example, it may be desirable to allow users to access and view certain websites but to prevent users from using selected functionality provided by the websites, e.g., functionality requiring a user to create an account and login or to exchange other specific information stored in a cookie. In these examples and others, a web cookie security policy might be configured and deployed to web cookie firewall applications, where the policy causes the web cookie firewall application to prevent users' web browsers from storing or using web cookies used to establish login sessions with one or more selected websites, while still allowing the use of other types of web cookies. Other example types of use cases and policies are illustrated herein. These web cookie security policies can be applied regardless of the location of a computing device or a type of network to which a monitored computing device is attached, thereby enabling organizations to implement web cookie use policies in diverse and distributed IT environments, among other benefits.

FIG. 1 is a diagram illustrating an environment in which a web cookie firewall application is used to monitor and control the use of web cookies at a computing device used to access websites according to some embodiments. In some embodiments, the network 100 is a personal or enterprise private network managed by a person or organization. In other embodiments, a network 100 is a provider network (or, "cloud" provider network) providing users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 128 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network that includes "back-end" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as several regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In some embodiments, a network 100 includes a hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs) and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In FIG. 1, the network 100 includes a web cookie firewall service 102 that enables users to configure web cookie policies (e.g., web cookie policy 104A, . . . , web cookie policy 104N) defining permissions related to the use of web cookies by user agents (e.g., web browser 106 including cookies 126 in cookie storage 132, or web browser 108 including cookie storage 118) running on computing devices (e.g., a computing device 132 or computing device 110) to which a web cookie policy is deployed. For example, each of the computing device 132 and computing device 110 may be a laptop, desktop computer, mobile device, or other computing device owned or otherwise available to a user or issued to a user by a business entity or other organization. A business entity or organization may further desire to configure one or more web cookie policies, where a policy can include any number of policy statements (e.g., policy statement 112A, . . . , policy statement 112N of the web cookie policy 104A). In some embodiments, the policy statements of a web cookie policy collectively define types of web cookies that are permitted or restricted for use by computing devices at which the corresponding policy is deployed. As indicated above, the types of web cookies that might be permitted or restricted by a web cookie policy can include login or session cookies associated with website domains on a defined blocklist, web cookies associated with any unknown or untrusted websites, or any other types of web cookies for which controlled access may be desired (e.g., cookies having specified names, cookies storing a specified type or amount of data, etc.).

The numbered circles "1"-"4" illustrate an example process including configuring a web cookie policy, deploying the web cookie policy to computing devices, and a web cookie firewall application 114 applying a web cookie policy at the computing devices according to some embodiments. At circle "1" in FIG. 1, a user uses a computing device 124 to access the web cookie firewall service 102 to configure a web cookie policy. Access to the web cookie firewall service 102 can be provided via a web-based console interface, command line interface (CLI), web-based console, or any other interface provided by the service. Although computing device 124 is depicted in FIG. 1 as part of the network 100, in general, the computing device 124 can be coupled to any network with access to the web cookie firewall service 102.

In some embodiments, the configuration of a web cookie policy includes providing some or all the following inputs: a name or identifier of the web cookie policy, an identification of one or more computing devices to which the web cookie policy is to be applied, data indicating one or more policy statements, permissions related to modification of the web cookie policy, or an identification of a template policy upon which the policy is to be based. As indicated above, such input may be provided by a user via various configuration-related graphical user interfaces (GUIs) provided as part of a web-based console, as part of API commands, or other types of requests. In some embodiments, the web cookie firewall service 102 stores the web cookie policies 104A, . . . 104N in a database or other data store, where policies can be stored in association with user accounts associated with each policy.

As indicated above, in some embodiments, the configuration of a web cookie policy includes configuring web cookie permissions via policy statements or other input. In some embodiments, a web cookie policy statement includes some or all the following information: an identifier of one or more domains or sub-domains (e.g., a domain associated with a website of interest such as example.com) to which the policy statement applies, an identifier of a type of web cookie to which the policy statement applies, and an indication of whether to block or permit web cookies matching the web cookie permission. In some embodiments, the identifier of a domain or sub-domain to which a policy statement applies can include a specific domain or sub-domain, a regular expression or other string pattern used to identify any domain or sub-domain matching a specified pattern, an identifier of a safelist or blocklist identifying permitted or restricted domains, or any combinations thereof.

In some embodiments, the identification of the type of web cookie to which a policy statement applies can include a specified cookie name (e.g., expressed as a string or string pattern), a cookie type (e.g., a session, login, or authentication cookie; a personalization cookie; a tracking cookie, etc.), a type of cookie content (e.g., expressed as a string, string pattern or content type definition), and the like. As described in more detail hereinafter, in some embodiments, to apply web cookie policies specifying a type of web cookie or a type of cookie content, a web cookie firewall application 114 can use one or more data analysis techniques (e.g., machine learning (ML) models trained to identify web cookie types, statistical analyses, predictive models, etc.) to identify web cookie types or web cookie content types.

In some embodiments, the web cookie firewall service 102 enables users to analyze their web cookie policies to help ensure that the policies are configured in a way that helps block undesirable types of web cookies. For example, automated reasoning techniques implemented by the web cookie firewall service 102 or a separate service can be used that automatically generates and checks the correctness of a collection of web cookie policies, e.g., to determine whether certain policies may be over permissive, conflicting, etc. In some embodiments, these techniques including using automated reasoners such as Satisfiability Modulo Theories (SMT) solvers, where such solvers operate on a translated version of the web cookie policies to check properties of the policies.

Although the example shown in FIG. 1 illustrates the configuration of a web cookie policy using the web cookie firewall service 102, in other embodiments, a web cookie policy is integrated into a web cookie firewall application 114 and may not involve manual policy configuration. For example, in some embodiments, users can download or otherwise obtain a web cookie firewall application 114 and use one or more default web cookie policies or configure custom web cookie policies locally.

In some embodiments, at circle "2," a web cookie firewall application 114 is deployed to one or more users' computing devices. In some embodiments, the web cookie firewall application 114 is a general-purpose software application, a web browser plugin or extension, or any other application that can execute on a user's computing device and access web cookies received by a computing device. In some embodiments, the web cookie firewall application 114 is configured to monitor web cookies received by a computing device by monitoring responses (e.g., HTTP responses) received by the computing device, monitoring outbound requests for the inclusion of web cookies, by monitoring the local storage of web cookies by one or more web browsers running on a computing device, or combinations thereof.

The web cookie firewall application 114 applies one or more web cookie policies to the monitored web cookies to control the use of web cookies at the computing device upon which the web cookie firewall application is running. In some embodiments, the web cookie firewall application 114 obtains relevant web cookie policies from a web cookie firewall service 102 upon installation and may obtain updates to obtained policies periodically. In other embodiments, a web cookie firewall application can be packaged with one or more web cookie policies that can be used without interaction with the web cookie firewall service 102. In some embodiments, the web cookie firewall application 114 may enable users to create web cookie policies locally or to modify policies obtained from the web cookie firewall service 102, if permitted. In some embodiments, the web cookie firewall application 114 or the application of individual web cookie policies can be enabled or disabled either locally or via remote instructions obtained from the web cookie firewall service 102.

In some embodiments, at circle "3A," a user uses a computing device 110 to request access to a website (e.g., "http://www.example.com") hosted by a web server 116. For example, the user may use a web browser 108 or other application running on the computing device 110 to request access to a webpage associated with the website, thereby causing the web browser 108 or other application to send a request to the web server 116 (e.g., possibly using the Domain Name System (DNS) to translate the requested domain name to a IP address for the web server 116). In this example, the first website is one for which a currently applicable web cookie policy 104A permits any web cookies to be used, including those used to establish login sessions with the website, to store personalized settings, etc. The web cookie policy 104A applied to the computing device 110, for example, may not include any policy statements blocking the use of web cookies associated with the domain of the website hosted by the web server 116, or the web cookie policy 104A may include one or more policy statements specifically permitting the use of web cookies associated the domain.

In some embodiments, at circle "3B," as part of a response to the request sent by the web browser 106, the web server 116 sends one or more web cookies to be stored by the web browser 106 at the user's computing device 110 in cookie storage 118. As indicated above, the web cookies may include login or session cookies (e.g., based on a user successfully authenticating with the web server or otherwise establishing a session), personalization cookies, and the like. In some embodiments, the web cookie firewall application 114 detects that the response includes the web cookies and determines whether any of the web cookies match any of the policy statements included in the web cookie policy 104A. In this example, based on the web cookie policy 104A, the web cookie firewall application 114 determines that the one or more web cookies are permitted for storage and use by the computing device 110. As such, the web browser 106 stores the web cookie 120A in cookie storage 118 (e.g., a file, database, or other data store accessible to the web browser 106).

In some embodiments, at circle "4A," the user uses the computing device to request access to a different website (e.g., http://www.example.net/) hosted by a different web server 122. In the example of FIG. 1, and in contrast to the website associated with the first domain, the web cookie policy 104A is configured to deny the storage and use of at least some types of cookies associated with the second domain. For example, it may be desirable to allow users to access websites associated with the domain but to prevent users from creating an account and logging into the website (e.g., to prevent the user from inadvertently or maliciously leaking data from the computing device 110 to the website). As such, the web cookie policy 104A may include a policy statement that prevents the storage and use of web cookies used by the website to establish login sessions. The policy statement, for example, may identify the web cookies by name (e.g., if a particular name of the cookies used for login sessions is known), by type (e.g., by specifying a desire to prevent the storage and use of any cookies determined to be login cookies), by content type (e.g., by identifying a type of content included in login cookies), or using any other identifying attributes. In some embodiments, based on the web cookie firewall application 114 determining that the web cookie policy prohibits use of web cookies associated with the domain, the name, or the type of web cookie associated with the web cookie 120B received from the web server 122, the web cookie firewall application 114 denies storage of the web cookie 120B on the computing device 110. As illustrated in FIG. 1, a web cookie firewall application 114 thus can be used to selectively block the storage and use or web cookies associated with specified domains, web cookie types, etc., without restricting users' ability to access the websites generally.

Figure 2:
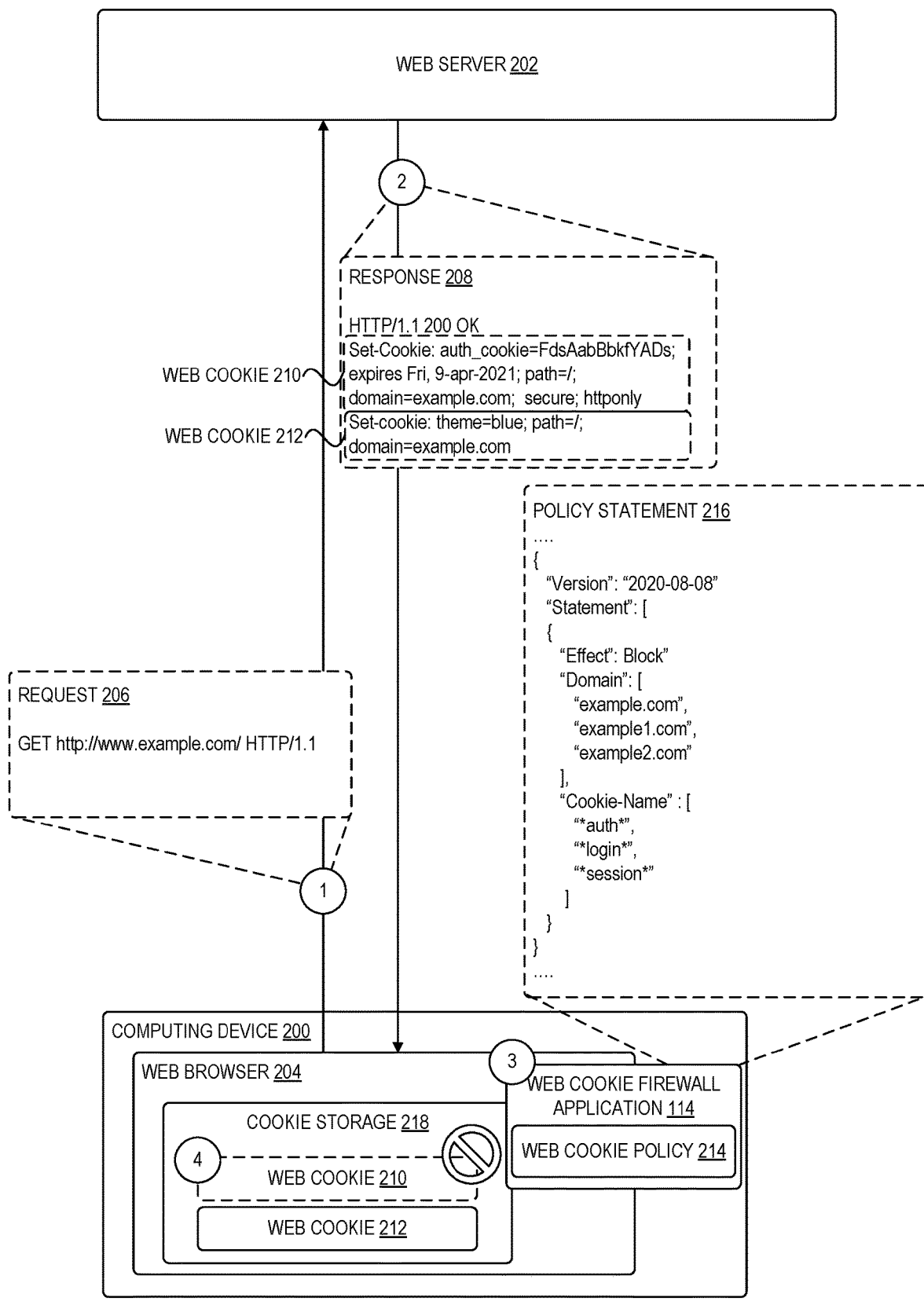
FIG. 2 is a diagram illustrating a web cookie firewall application selectively filtering inbound web cookies based on web cookie attributes as configured in a web cookie policy according to some embodiments.

FIG. 2 is a diagram illustrating a web cookie firewall application selectively filtering inbound web cookies based on web cookie attributes as configured in a web cookie policy according to some embodiments. FIG. 2 illustrates a computing device 200 accessing, via a web browser 204, a website hosted by a web server 202. In this example, at circle "1," the computing device 200 sends a GET HTTP request 206 to access a website hosted by the web server 202. Responsive to the request from the computing device, at circle "2," the web server 202 sends an HTTP response 208 including two or more "Set-Cookie" headers in the response 208. The response 208, for example, is shown as including a first web cookie 210, named "auth_cookie" and including several cookie attributes, and a second web cookie 212 named "theme". The web cookie 210 may, for example, correspond to an authentication cookie, whereas the web cookie 212 corresponds to a personalization cookie (e.g., indicating a theme the user has selected and that is used to display the website in a certain format). The Set-Cookie header can also specify additional attributes of a cookie including a domain, a path, an expiration date, and a maximum age for the cookie, as shown in the example of web cookie 210. The domain attribute instructs the web browser 204 to include the cookie only in requests to the same domain (e.g., if the domain for the cookie is "example.com", then the web browser sends the cookie only with every request to the example.com and its subdomains). The path attribute optionally restricts the use of the cookie to a specified path within the domain, while the expiration and maximum age attributes define a time for the cookie to be deleted (e.g., either at a set expiration time or when the cookie reaches a maximum age).

As indicated herein, in some embodiments, a web cookie policy 214 can be configured to permit or deny cookies based on any combination of names, attributes, or identified types associated with web cookies. In the example of FIG. 2, the web cookie policy 214 includes a policy statement 216 configured to cause a web cookie firewall application 114 to block web cookies associated with a set of domains (e.g., "example.com", "example1.com", and "example2.com") and that are identified by any of a set of specified names (e.g., "*auth*", "*login*", or "*session*", where the "*" character represents a wildcard character). The policy statement 216 illustrates one example format; in general, a policy statement can be expressed in any format and include any combination of identifying cookie attributes and desired permissions. For example, a policy statement may prohibit certain types of cookies to be used in connection with any domain that is not included in a safelist or other defined list, prohibit certain types of cookies to be used in connection with any domain that is included on a threat list, etc. In some embodiments, a policy statement can include instructions related modifying certain types of web cookies, e.g., to set specific values in association with a web cookie.

In some embodiments, at circle "3," the web cookie firewall application 114 applies the web cookie policy 214 to the web cookies 210, 212 contained in the response 208. In some embodiments, the web cookie firewall application 114 intercepts the response 208 and may remove or modify cookie information from the response 208. In other embodiments, the web cookie firewall application 114 applies web cookie policies by modifying web cookies stored in cookie storage 218 or at any point in time. In the example of FIG. 2, the web cookie firewall application 114 applies the policy statement 216 causing the web cookie 212 to be stored in the cookie storage 218 (e.g., because no policy prevents the storage or use of the web cookie 212) and further causing the web cookie 210 not to be stored in the cookie storage 218 or to be deleted from cookie storage 218 (e.g., because the web cookie 210 matches the policy statement 216 prohibiting the storage or use of cookies matching the policy statement). In this manner, a user using the web browser 204 may not be able to establish a login session with the website hosted by the web server 202 due to computing device's 200 inability to store or use authentication cookies received from the web server 202 while still being able to access the website and to configure various personalization settings. In some embodiments, the identification of a web cookie as a login or session cookie is performed by the web cookie firewall application 114 using data analysis techniques such as a ML model trained to recognize such cookies, as described in more detail in relation to FIG. 4.

Figure 3:
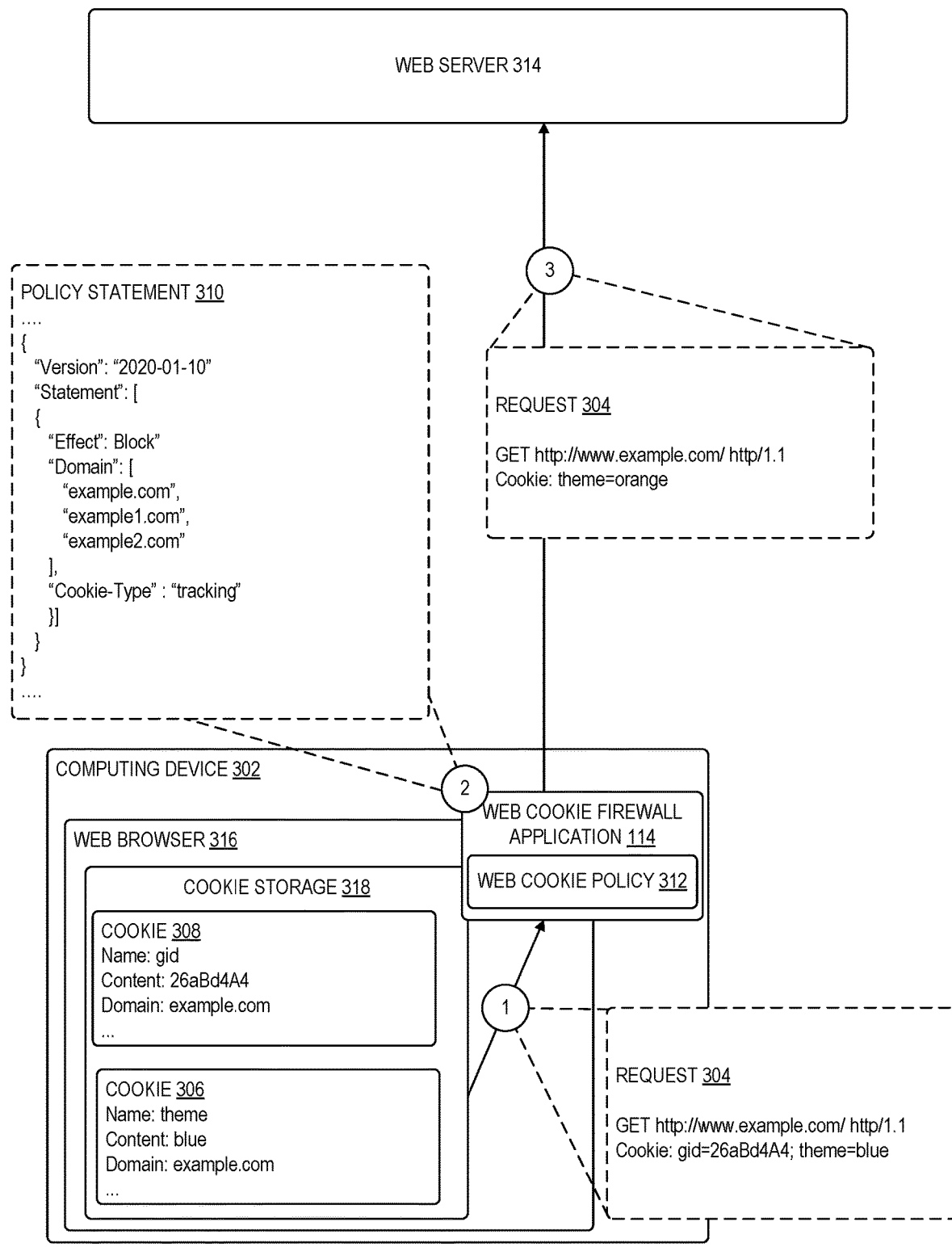
FIG. 3 is a diagram illustrating a web cookie firewall application selectively filtering outbound web cookies based on a configured web cookie policy according to some embodiments.

FIG. 3 is a diagram illustrating the selective filtering of web cookies included in requests sent to web servers according to some embodiments. The examples described above in relation to FIG. 2 illustrated the use of a web cookie firewall application to filter the storage and use of web cookies received from web servers according to defined web cookie policies. In some embodiments, a web cookie firewall application can also filter or modify web cookies included in requests sent by web browser to a web server. For example, the application of a web cookie policy to outbound cookies can be used to filter the use of cookies stored by a web browser but without deleting the cookies (e.g., so that they may be used at a later point in time) or to set certain values for web cookies (e.g., to automatically apply certain personalization configurations).

As shown, at circle "1," a web browser 316 running on a computing device 302 sends a request 304 to access a website associated with the example.com domain and hosted by a web server 314. In this example, the web browser has stored two web cookies 306, 308 associated with the example.com domain and includes the web cookies in the request 304 (e.g., the web cookies named "gid" and "theme"). Furthermore, a policy statement 310 from a web cookie policy 312 has been configured to block web cookies determined to be tracking web cookies (e.g., that track user behavior across a website or multiple different websites). Although not depicted, the web cookie policy 312 further includes a policy statement that modifies a web cookie used to determine a theme for the website hosted by the web server 314 and modify the value to "orange" (e.g., such that a same theme is always used regardless of user modification).

In some embodiments, at circle "2," the web cookie firewall application 114 intercepts the request 304 and applies the web cookie policy 312 including policy statement 310 to the request 304. In this example, the web cookie firewall application 114 determines that the cookie named "gid" is a tracking cookie (e.g., based on the name of the cookie, the contents of the cookie, by providing the web cookie as input to a ML model used to determine whether the cookie is likely a tracking cookie, or using any other method) and prevents the use of the "gid" cookie (e.g., by removing the web cookie from the request 304 and optionally deleting the web cookie from cookie storage 318). Furthermore, based on another policy statement (not shown) the web cookie firewall application 114 modifies the value of the "theme" web cookie to "orange." Thus, as shown at circle "3," the request 304 sent to the web server 314 now includes only the "theme" web cookie set with the value "orange" and does not include the "gid" web cookie. In general, a web cookie firewall application can perform any modifications to the web cookies stored by a computing device either before or as part of a request according to one or more defined policies, thereby controlling the computing device's ability to interact with certain websites using web cookies.

Figure 4:
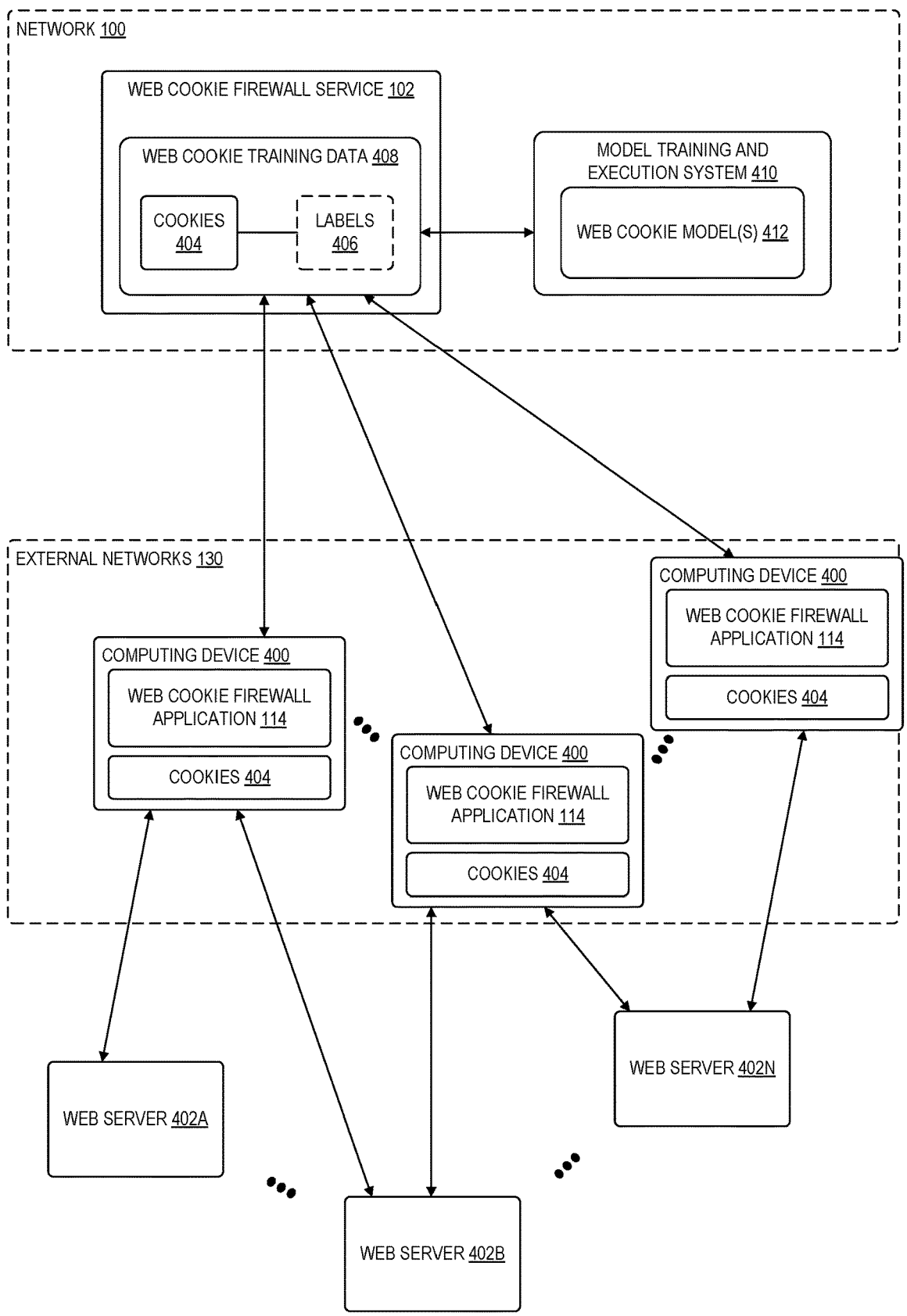
FIG. 4 is a diagram illustrating the collection of sample web cookies and the use the sample web cookies to train one or more machine learning (ML) models to identify defined types of web cookies according to some embodiments.

FIG. 4 is a diagram illustrating the collection of web cookies and the generation of one or more ML models used to identify various types of web cookies according to some embodiments. In the example of FIG. 4, a web cookie firewall service 102 collects web cookie training data 408 from computing devices 400 as the computing devices access various web servers 402A, . . . , 402N. For example, the computing devices 400 can be any computing devices with the web cookie firewall application 114 installed or any other application capable of sending web cookie data (e.g., collected web cookies 404) to the web cookie firewall service 102. The computing devices 400 may be configured to collect and send the web cookie information as the computing devices are used in normal operation, or some or all the computing devices may be configured to crawl websites to collect web cookies 404.

In some embodiments, the web cookie firewall service 102 collects the web cookies 404 and optionally associates the web cookies 404 with labels 406 (e.g., identifying each of the web cookies as a login or session cookie, tracking cookie, personalization cookie, etc.) to form web cookie training data 408. In some embodiments, the web cookie training data 408 can then be provided to a model training and execution system 410 to train one or more web cookie model(s) 412 that can be used to identify types of web cookies. In some embodiments, the training data 408 is collected on continuous basis and used to continuously train and refine an action completion time model as additional web cookie data becomes available.

In some embodiments, a model training and execution system 410 or other component optionally performs various data pre-processing operations on the web cookie training data 408. In some embodiments, pre-processing operations can also include organizing the data in various ways, cleaning or transforming the data, deduplicating data entries, or any other operations to aid in the model training processes. In some embodiments, the optionally preprocessed data is stored in a training data store. In some embodiments, the training data store can be any type of data storage managed either by the web cookie firewall service 102 or by another service or application accessible to the web cookie firewall service (e.g., by an object storage service of the provider network 100).

In some embodiments, users can interact with the model training and execution system 410 via a frontend of the model training and execution system 410. For example, a user device can provide a training request that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, a container image can include one or more layers, where each layer represents an executable instruction. Some or all the executable instructions together represent an algorithm that defines a ML model. The executable instructions (for example, the algorithm) can be written in any programming language (for example, Python, Ruby, C++, Java, etc.). In some embodiments, the algorithm is pre-generated and obtained by a user, via the user device, from an algorithm repository. In some embodiments, the algorithm is completely user-generated or partially user-generated (for example, user-provided code modifies or configures existing algorithmic code).

In some embodiments, instead of providing a container image (or identifier thereof), the user device may provide an algorithm written in any programming language. The model training and execution system 410 may then package the algorithm into a container (optionally with other code, such as a "base" ML algorithm supplemented with user-provided code) that is eventually loaded into a virtual machine instance for training a machine learning model. In some embodiments, the model training and execution system 410 can handle the acquisition and configuration of compute capacity (for example, containers, instances, etc., which are described in greater detail below) based on the information describing the computing machine on which to train a ML model provided by the user device. The model training and execution system 410 can then train ML models using the compute capacity.

To perform the ML model training, in some embodiments, computing resources execute instructions according to hyperparameter values included in the training request. As an illustrative example, a model training and execution system 410 trains a ML model by identifying values for certain parameters (for example, coefficients, weights, centroids, etc.). The identified values depend on hyperparameters that define how the training is performed. Thus, the computing resources can execute the executable instructions to initiate a ML model training process, where the training process is run using the hyperparameter values included in the training request. Execution can include applying the obtained training data as input parameters to some or all the instructions being executed.

In some embodiments, the model training processes generate model data. The model data may be stored, for example, in one or more data files in a model data store and can include characteristics of the ML model being trained, such as a number of layers in the machine learning model, hyperparameters of the machine learning model, coefficients of the machine learning model, weights of the machine learning model, and/or the like. In particular, the generated model data includes values for the characteristics that define the ML model being trained. For example, one or more web cookie model(s) 412 may be trained that enable the web cookie firewall service 102 and web cookie firewall application 114 to identify a type of a web cookie (e.g., a login or session cookie, a tracking cookie, a personalization cookie, etc.) based on input features associated with a web cookie (e.g., a name of the cookie, the content of web cookie, the size of the web cookie, a domain with which the cookie is associated, etc.).

In some embodiments, the model training and execution system 410 further includes a model execution system (which may be part of or separate from the model training system), including a single physical computing device or multiple physical computing devices that are interconnected using one or more computing networks (not shown), where the physical computing device(s) host one or more virtual machine instances. The model training and execution system 410 can handle the acquisition and configuration of compute capacity (for example, containers, instances, etc.) based on requests to execute trained ML models. The model training and execution system 410 can then execute ML models using the compute capacity.

In some embodiments, a request to execute a ML model is transmitted to the model training and execution system 410, where the request includes an input to a ML model (for example, a set of input data). The model training and execution system 410 or another system executes the code in response to receiving the execution request. In particular, execution of the code causes the executable instructions in the code corresponding to the algorithm to read the model data file (e.g., model data obtained from a model data store), use the input included in the execution request as an input parameter, and generate a corresponding output. As an illustrative example, the algorithm can include coefficients, weights, layers, cluster centroids, and/or the like. The executable instructions in the code corresponding to the algorithm can read the model data file to determine values for the coefficients, weights, layers, cluster centroids, and/or the like. The executable instructions can include input parameters, and the input included in the execution request can be supplied as the input parameters. With the ML model characteristics and the input parameters provided, execution of the executable instructions can be completed resulting in an output. In some embodiments, the output is stored in a data store. Alternatively or in addition, the model training and execution system 410 transmits the output to a user device that submitted the execution request. In some embodiments, the operating environment supports many different types of machine learning models, such as classification models, multi arm bandit models, reinforcement learning models, ensemble machine learning models, deep learning models, and/or the like.

Although FIG. 4 illustrates the training and use of ML models to identify types of web cookies, other types of data analysis techniques can be used to identify web cookie types. For example, based on a collected set of cookies of various web cookie types and from different sources, data analysis techniques such as any of logistic regression, random forests, decision trees, neural networks, classification models, clustering models, and the like can be used by the web cookie firewall service 102 or web cookie firewall application 114 to identify a type of web cookie associated with newly obtained web cookies (e.g., web cookies contained in requests or responses intercepted by a web cookie firewall application 114 at a computing device).

Figure 5:
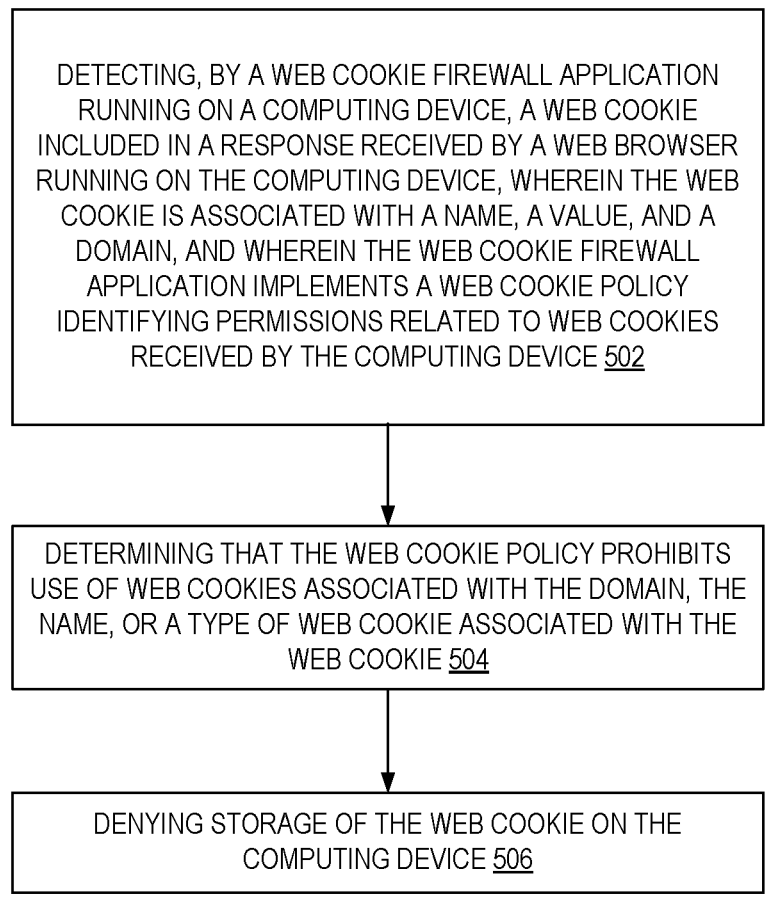
FIG. 5 is a flow diagram illustrating operations of a method for monitoring and controlling the use of web cookies at computing devices by a web cookie firewall application according to some embodiments.

FIG. 5 is a flow diagram illustrating operations 500 of a method for monitoring and controlling the use of web cookies at computing devices by a web cookie firewall application according to some embodiments. Some or all the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the web cookie firewall application 114 or web cookie firewall service 102 of the other figures.

The operations 500 include, at block 502, detecting, by a web cookie firewall application running on a computing device, a web cookie included in a response (e.g., an HyperText Transfer Protocol (HTTP) response) received by a web browser running on the computing device, wherein the web cookie is associated with a name, a value, and a domain, and wherein the web cookie firewall application implements a web cookie policy identifying permissions related to web cookies received by the computing device.

The operations 500 further include, at block 504, determining that the web cookie policy prohibits use of web cookies associated with the domain, the name, or a type of web cookie associated with the web cookie.

The operations 500 further include, at block 506, denying storage of the web cookie on the computing device.

In some embodiments, the web cookie is a first web cookie, wherein the type of web cookie is a first type of web cookie, and wherein the web cookie policy permits use of web cookies associated with the domain and a second type of web cookie corresponding to a personalization web cookie, and where the operations further include: detecting a second web cookie included in the response, wherein the second web cookie is associated with the second web cookie type; and permitting storage of the second web cookie on the computing device.

In some embodiments, the web cookie firewall application uses a machine learning (ML) model to determine that the web cookie is an authentication cookie, and wherein determining that the policy statement applies to the web cookie includes determining that the web cookie is an authentication cookie.

In some embodiments, the operations further include obtaining, by the web cookie firewall application, the web cookie policy from a web cookie firewall service.

In some embodiments, the operations further include denying storage of the web cookie on the computing device by preventing the web browser from storing the web cookie in local storage managed by the web browser or by deleting the web cookie from the local storage managed by the web browser.

In some embodiments, determining that the web cookie policy denies includes determining that the domain is not included on a safelist of permitted domains; and determining that web cookie is a login or session cookie.

In some embodiments, the web cookie is a first web cookie, wherein a second web cookie is stored on the computing device, and where the operations further include modifying, by the web cookie firewall application, a value of the second web cookie based on the web cookie policy.

In some embodiments, the computing device is owned by an organization and issued to a user associated with the organization, and wherein the web cookie policy is created by a user associated with the organization and deployed to a plurality of computing devices owned by the organization including the computing device.

In some embodiments, the web cookie is a first web cookie included in a first HTTP response, where determining that the web cookie policy prohibits use of web cookies associated with the domain, the name, or the type of web cookie includes determining that the domain associated with the first web cookie is not included on a domain safelist, and where the operations further include: detecting, by the web cookie firewall application, a second web cookie included a second HTTP response; determining that a domain associated with the second web cookie is included on a domain safelist; and allowing storage of the second web cookie on the computing device.

In some embodiments, the web cookie policy is specified in a structured policy language, and wherein the web cookie policy includes a policy statement indicating that use of web cookies associated with the domain, the name, or a type of web cookie associated with the web cookie is prohibited.

In some embodiments, denying storage of the web cookie on the computing device prevents a user from establishing a login session with websites associated with the domain.

Figure 6:
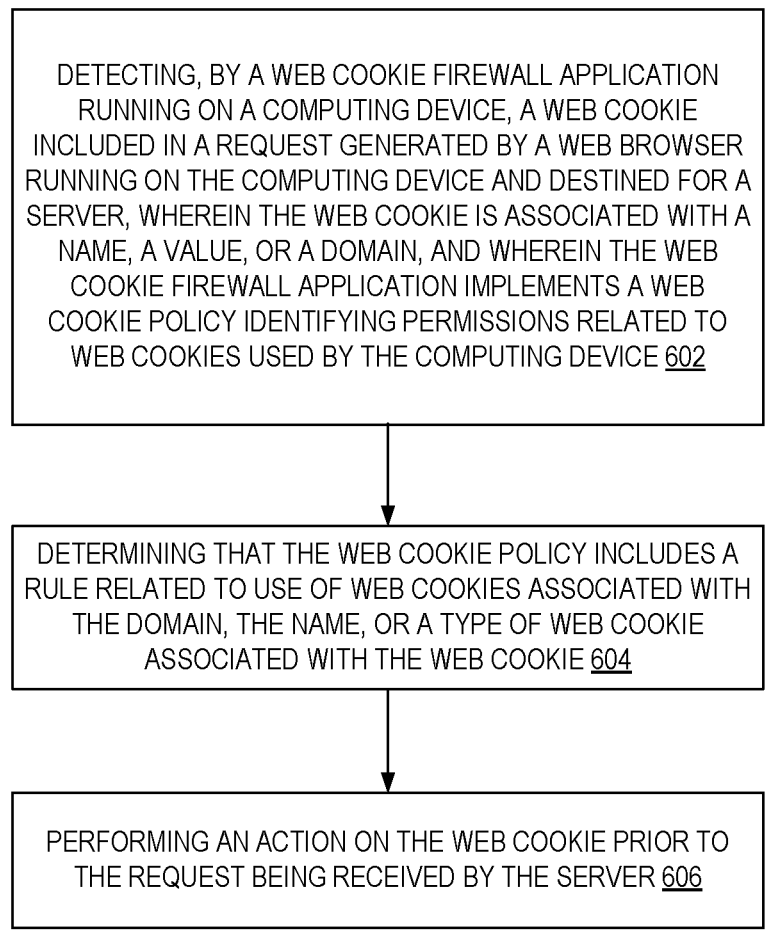
FIG. 6 is a flow diagram illustrating operations of a method for monitoring and controlling, by a web cookie firewall application, the use of web cookies in outbound requests sent by computing devices by according to some embodiments.

FIG. 6 is a flow diagram illustrating operations of a method for monitoring and controlling, by a web cookie firewall application, the use of web cookies in outbound requests sent by computing devices by according to some embodiments. Some or all the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the web cookie firewall application 114 or web cookie firewall service 102 of the other figures.

The operations 600 include, at block 602, detecting, by a web cookie firewall application running on a computing device, a web cookie included in a request generated by a web browser running on the computing device and destined for a server, wherein the web cookie is associated with a name, a value, or a domain, and wherein the web cookie firewall application implements a web cookie policy identifying permissions related to web cookies used by the computing device.

The operations 600 further include, at block 604, determining that the web cookie policy includes a rule related to use of web cookies associated with the domain, the name, or a type of web cookie associated with the web cookie.

The operations 600 further include, at block 606, performing an action on the web cookie prior to the request being received by the server.

In some embodiments, the action includes at least one of: removing the web cookie from the request, modifying a value specified by the web cookie, or obfuscating contents of the web cookie.

In some embodiments, the web cookie is a first web cookie associated with a first type of web cookie, wherein the request further includes a second web cookie associated with a second type of web cookie, and wherein the operations further include: determining that the web cookie policy permits use of the second web cookie; and ignoring the second web cookie in the request.

In some embodiments, denying storage of the web cookie on the computing device prevents a user from establishing a login session with websites associated with the domain.

Figure 7:
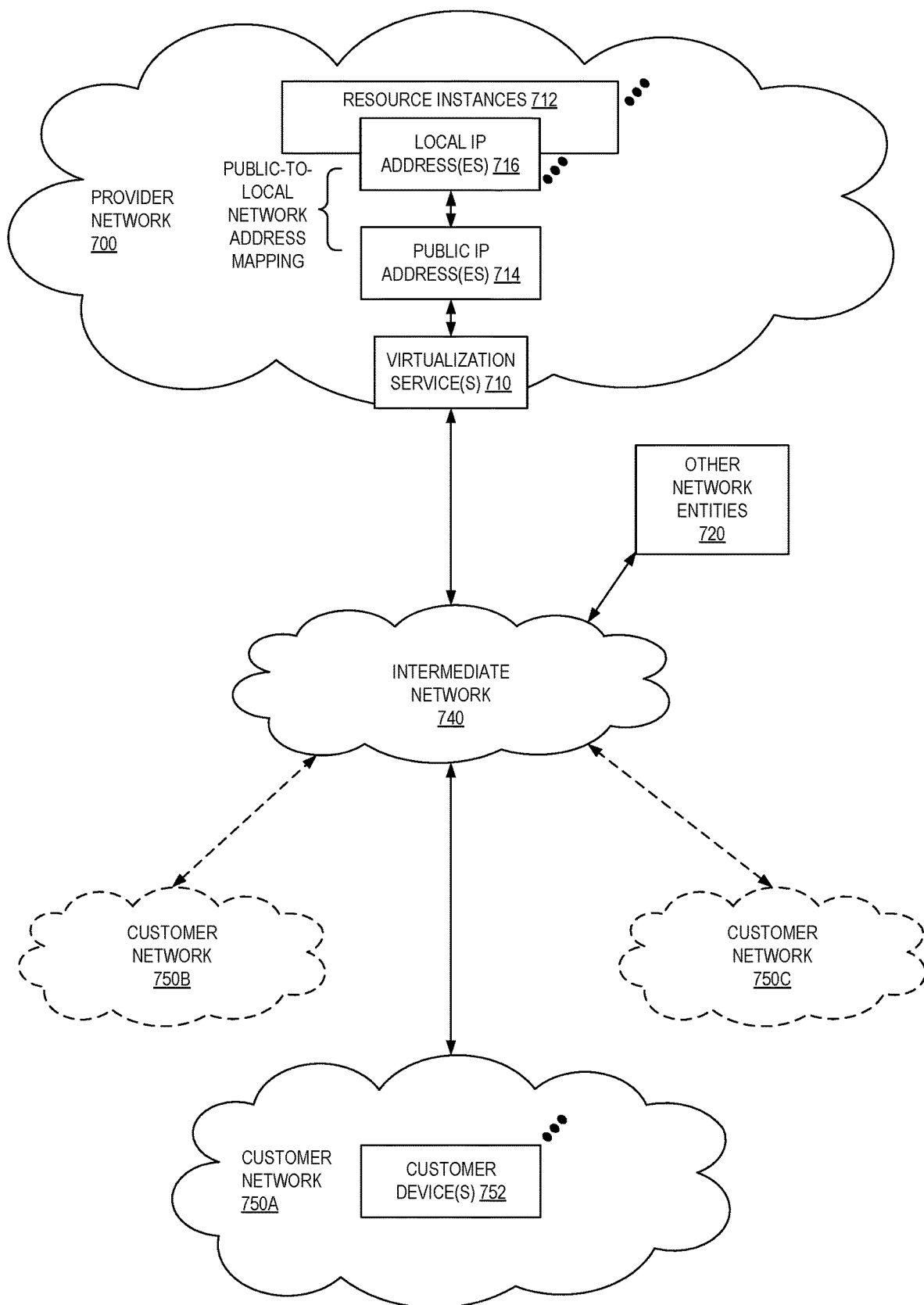
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
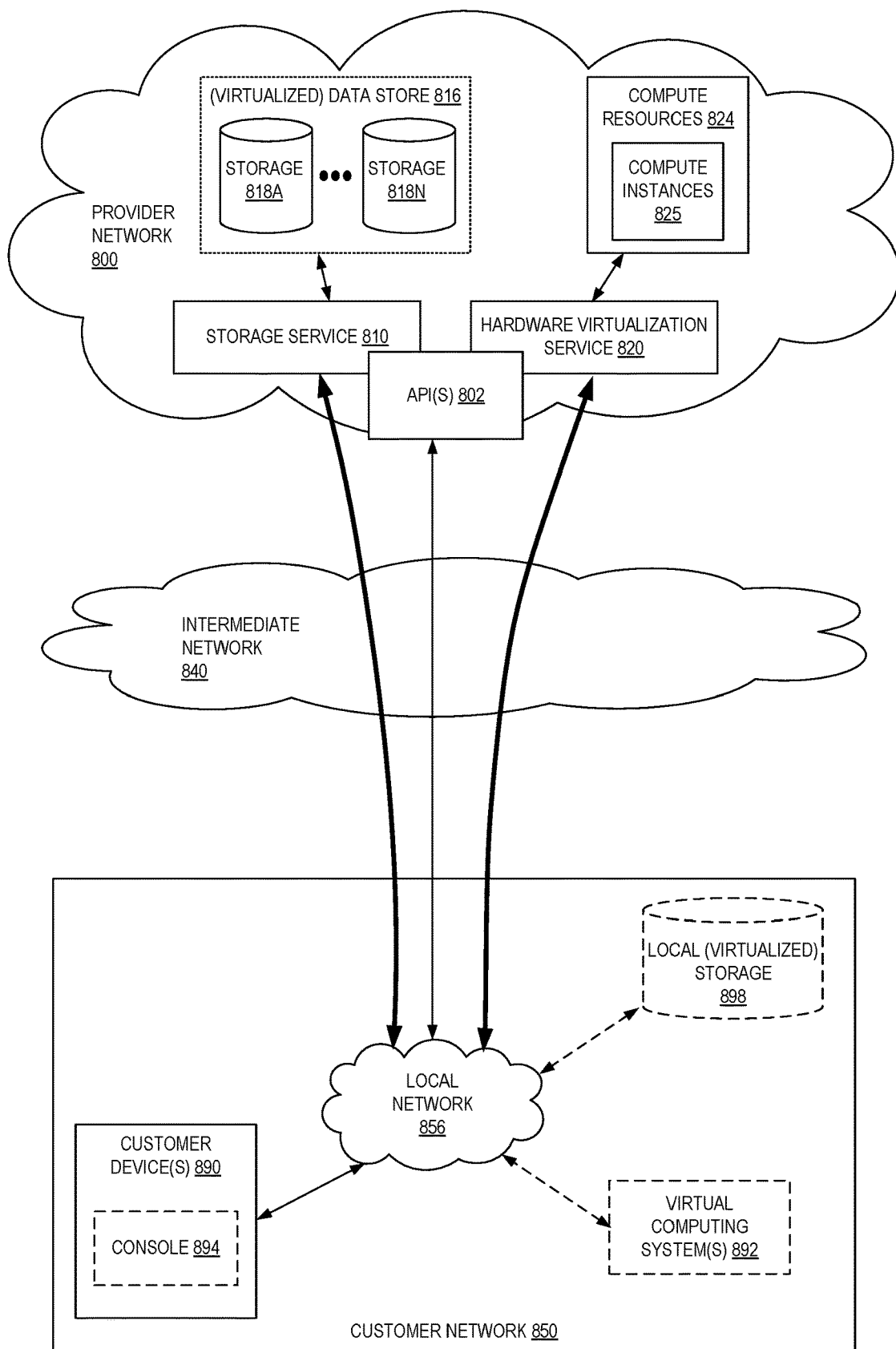
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

Figure 9:
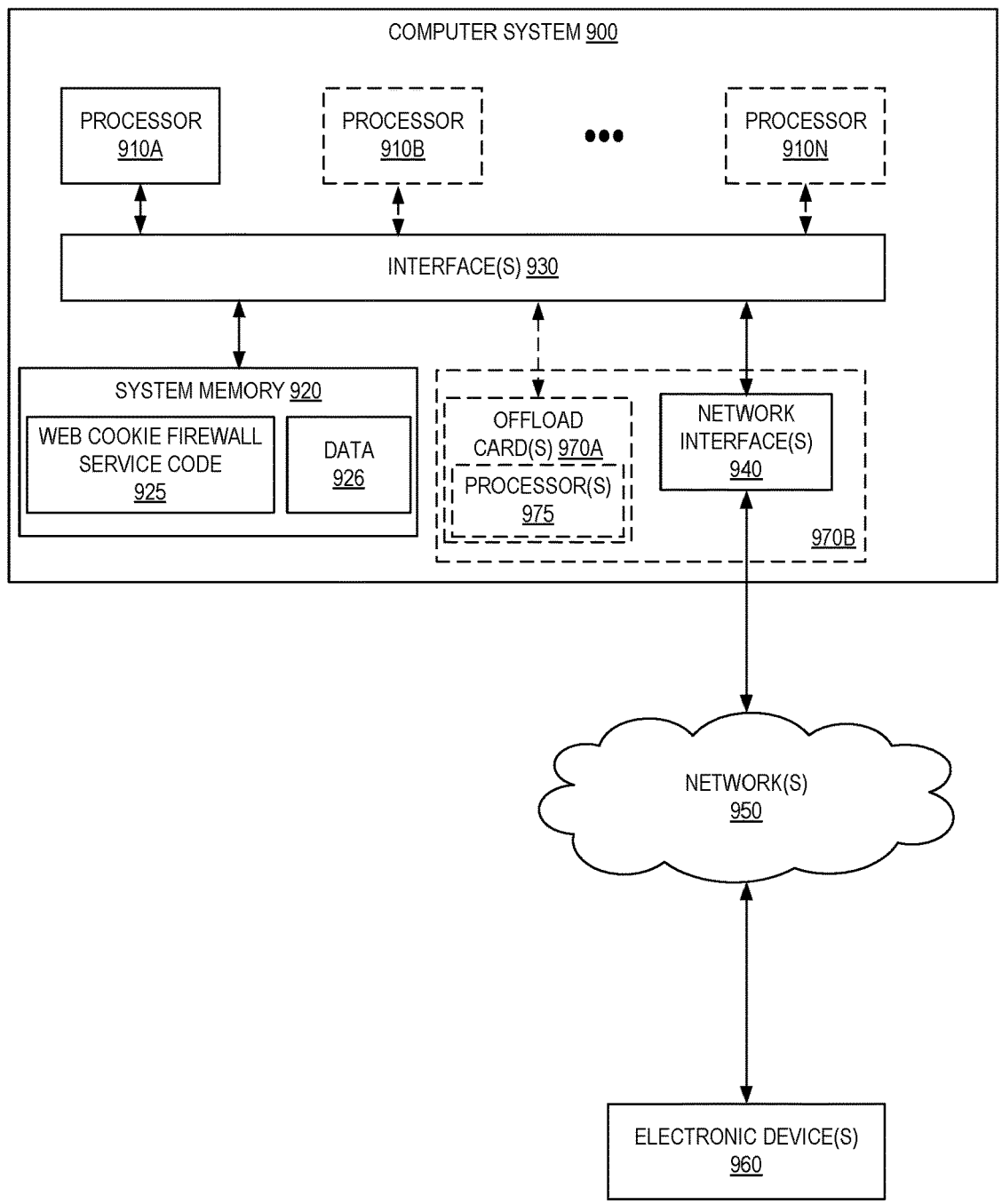
FIG. 9 is a block diagram illustrating an example computer system that may be used in some embodiments.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network. In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as cookie firewall service code 925 (e.g., executable to implement, in whole or in part, the web cookie firewall service 102) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a web cookie firewall service of a cloud provider network, user-specified input defining a web cookie policy, wherein the web cookie policy includes a policy statement identifying:
a domain,
a web cookie name or a web cookie type, and
an indication to deny storage of received web cookies that are from the domain and that match the web cookie name or web cookie type; and
sending, by the web cookie firewall service to a web cookie firewall application running on a computing device outside of the cloud provider network, the web cookie policy, wherein the web cookie firewall application, upon detecting a web cookie included in a response received from a web server associated with the domain, uses the web cookie policy to:
determine that the policy statement of the web cookie policy applies to the web cookie included in the response based on attributes associated with the web cookie matching the web cookie name or the web cookie type specified by the policy statement, and
deny storage of the web cookie at the computing device.

2. The computer-implemented method of claim 1, wherein the policy statement is a first policy statement, wherein the web cookie type is a first web cookie type, wherein the web cookie policy includes a second policy statement identifying: the domain, a second web cookie type, and an indication to permit use of web cookies associated with the domain and the second web cookie type, and wherein the web cookie firewall application, upon detecting a second web cookie included in the response, uses the web cookie policy to:
determine that the second policy statement applies to the second web cookie included in the response; and
permitting storage of the second web cookie at the computing device.

3. The computer-implemented method of claim 1, wherein the web cookie firewall application uses data analysis techniques to determine that the web cookie is an authentication cookie, and wherein determining that the policy statement applies to the web cookie includes determining that the web cookie is an authentication cookie.

4. A computer-implemented method comprising:
receiving, by a web cookie firewall application running on a computing device, from a web cookie service implemented in a cloud provider network, a user-specified web cookie policy identifying permissions related to web cookies received by the computing device;
detecting, by the web cookie firewall application, a web cookie included in a response received by a web browser running on the computing device, wherein the web cookie is associated with a domain and further associated with a web cookie name or a web cookie type;
determining, based on an analysis of at least the domain and one or more of the web cookie name or the web cookie type, that the web cookie policy prohibits storage of the web cookie; and
denying storage of the web cookie on the computing device.

5. The computer-implemented method of claim 4, wherein the web cookie is a first web cookie associated with a first type of web cookie, wherein the response further includes a second web cookie associated with a second type of web cookie, and wherein the method further comprises:
determining that the web cookie policy permits use of the second web cookie; and
permitting storage of the second web cookie at the computing device.

6. The computer-implemented method of claim 4, wherein the web cookie firewall application uses data analysis techniques to determine that the web cookie is an authentication cookie, and wherein determining that the web cookie policy prohibits storage of the web cookie includes determining that the web cookie is an authentication cookie.

7. The computer-implemented method of claim 4, further comprising transmitting a request, by the web cookie firewall application, to obtain the web cookie policy from a web cookie firewall service.

8. The computer-implemented method of claim 4, wherein denying storage of the web cookie on the computing device comprises either:
preventing the web browser from storing the web cookie in local storage managed by the web browser; or
deleting the web cookie from the local storage managed by the web browser.

9. The computer-implemented method of claim 4, wherein determining that the web cookie policy prohibits storage of the web cookie includes:
determining that the domain is not included on a safelist of permitted domains; and
determining that web cookie is a login or session cookie.

10. The computer-implemented method of claim 4, wherein the web cookie is a first web cookie, wherein a second web cookie is stored on the computing device, and wherein the method further comprises modifying, by the web cookie firewall application, a value of the second web cookie based on the web cookie policy.

11. The computer-implemented method of claim 4, wherein the computing device is owned by an organization and issued to a user associated with the organization, and wherein the web cookie policy is created by a user associated with the organization and deployed to a plurality of computing devices owned by the organization including the computing device.

12. The computer-implemented method of claim 4, wherein the web cookie is a first web cookie included in a first response, wherein determining that the web cookie policy prohibits storage of the web cookie includes determining that the domain associated with the first web cookie is not included on a domain safelist, and wherein the method further comprises:
detecting, by the web cookie firewall application, a second web cookie included in a second response;
determining that a domain associated with the second web cookie is included on a domain safelist; and
allowing storage of the second web cookie on the computing device.

13. The computer-implemented method of claim 4, wherein the web cookie policy is specified in a structured policy language, and wherein the web cookie policy includes a policy statement indicating that storage of web cookies associated with the domain and matching the web cookie name or the web cookie type is prohibited.

14. The computer-implemented method of claim 4, wherein denying storage of the web cookie on the computing device prevents a user from establishing a login session with websites associated with the domain.

15. A computer-implemented method comprising:
receiving, by a web cookie firewall application running on a computing device, from a web cookie service implemented in a cloud provider network, a user-specified web cookie policy identifying permissions related to web cookies used by the computing device;
detecting, by the web cookie firewall application, a web cookie included in a request generated by a web browser running on the computing device and destined for a server, wherein the web cookie is associated with a name, a value, or a domain;
determining that the web cookie policy includes a rule related to use of web cookies associated with the domain, the name, or a type of web cookie associated with the web cookie; and
performing an action on the web cookie prior to the request being received by the server.

16. The computer-implemented method of claim 15, wherein the action includes at least one of: removing the web cookie from the request, modifying a value specified by the web cookie, or obfuscating contents of the web cookie.

17. The computer-implemented method of claim 15, wherein the web cookie is a first web cookie associated with a first type of web cookie, wherein the request further includes a second web cookie associated with a second type of web cookie, and wherein the method further comprises:
determining that the web cookie policy permits use of the second web cookie; and
ignoring the second web cookie in the request.

18. The computer-implemented method of claim 15, wherein denying storage of the web cookie on the computing device prevents a user from establishing a login session with websites associated with the domain.

19. A system comprising:
a first one or more electronic devices to implement a web cookie firewall service in a cloud provider network, wherein the web cookie firewall service includes instructions that upon execution cause the web cookie firewall service to:
receive user-specified input defining a web cookie policy, wherein the web cookie policy includes a policy statement identifying:
a domain,
a web cookie name or a web cookie type, and
an indication to deny storage of received cookies that are from the domain and that match the web cookie name or the web cookie type, and
send the web cookie policy to a web cookie firewall application; and
a second one or more electronic devices to implement the web cookie firewall application, wherein the web cookie firewall application includes instructions that upon execution cause the web cookie firewall application to:
detect a web cookie included in a HyperText Transfer Protocol (HTTP) response received by the second one or more electronic devices from a web server associated with the domain,
determine that the policy statement of the web cookie policy applies to the web cookie included in the HTTP response based on attributes associated with the web cookie matching the web cookie name or the web cookie type specified by the policy statement, and
deny storage of the web cookie at the second one or more electronic devices.

20. The system of claim 19, wherein the web cookie is a first web cookie, wherein the type of web cookie is a first type of web cookie, and wherein the web cookie policy permits use of web cookies associated with the domain and a second type of web cookie corresponding to a personalization web cookie, and wherein the web cookie firewall application further includes instructions that upon execution cause the web cookie firewall application to:
detect a second web cookie included in the HTTP response, wherein the second web cookie is associated with the second web cookie type; and
permit storage of the second web cookie on the second one or more electronic devices.

21. The system of claim 19, wherein the web cookie firewall application uses a machine learning (ML) model to determine that the web cookie is an authentication cookie, and wherein determining that the policy statement applies to the web cookie includes determining that the web cookie is an authentication cookie.

22. The system of claim 19, wherein the web cookie firewall application further includes instructions that upon execution cause the web cookie firewall application to transmit a request to obtain the web cookie policy from the web cookie firewall service.

23. The system of claim 19, wherein the web cookie firewall application further includes instructions that upon execution cause the web cookie firewall application to deny storage of the web cookie on the second one or more electronic devices by preventing a web browser from storing the web cookie in local storage managed by the web browser or by deleting the web cookie from the local storage managed by the web browser.

24. The system of claim 19, wherein the web cookie firewall application further includes instructions that upon execution cause the web cookie firewall application to determine that the web cookie policy denies storage of the web cookie, the determination including:
determining that the domain is not included on a safelist of permitted domains; and
determining that web cookie is a login or session cookie.

* * * * *